United States Patent [19]
Karrer

[11] Patent Number: 6,152,513
[45] Date of Patent: Nov. 28, 2000

[54] SYSTEM FOR PICKUP TRUCKS HAVING STORAGE COMPARTMENT

[76] Inventor: Robert B. Karrer, 3489 Fulton Avenue, Smithers, British Columbia, Canada, V0J 2N0

[21] Appl. No.: 09/152,200

[22] Filed: Sep. 14, 1998

Related U.S. Application Data

[63] Continuation-in-part of application No. 08/807,752, Feb. 27, 1997, Pat. No. 5,882,058.

[51] Int. Cl.⁷ ....................................................... B60R 9/00
[52] U.S. Cl. ........................................... 296/37.6; 224/404
[58] Field of Search ........................... 296/10, 39.2, 37.6, 296/100.01, 100.02, 100.04, 100.06, 100.07; 224/402, 403, 404

[56] References Cited

U.S. PATENT DOCUMENTS

| | | | |
|---|---|---|---|
| 3,954,296 | 5/1976 | Patnode | 296/10 |
| 4,522,326 | 6/1985 | Tuohy, III | 296/37.6 |
| 5,037,153 | 8/1991 | Stark | 296/37.6 |
| 5,102,180 | 4/1992 | Finley | 296/100.02 |
| 5,228,736 | 7/1993 | Dutton | 296/39.2 |
| 5,480,206 | 1/1996 | Hathaway et al. | 296/36 |
| 5,615,922 | 4/1997 | Blanchard | 296/37.6 |
| 5,882,058 | 3/1999 | Karrer | 296/39.2 |

*Primary Examiner*—Sherman Basinger
*Attorney, Agent, or Firm*—Christopher R. Scott

[57] ABSTRACT

A storage compartment for attachment to anchor rails on a pickup truck. The compartment has a main body and a bottom defining an open-ended box and doors are coupled to the box and operable to close the box and to provide access, and releasable latches are coupled to the box to attach the storage compartment to the anchor rails. The compartment is part of a cargo anchoring and protection system for pickup trucks.

8 Claims, 3 Drawing Sheets

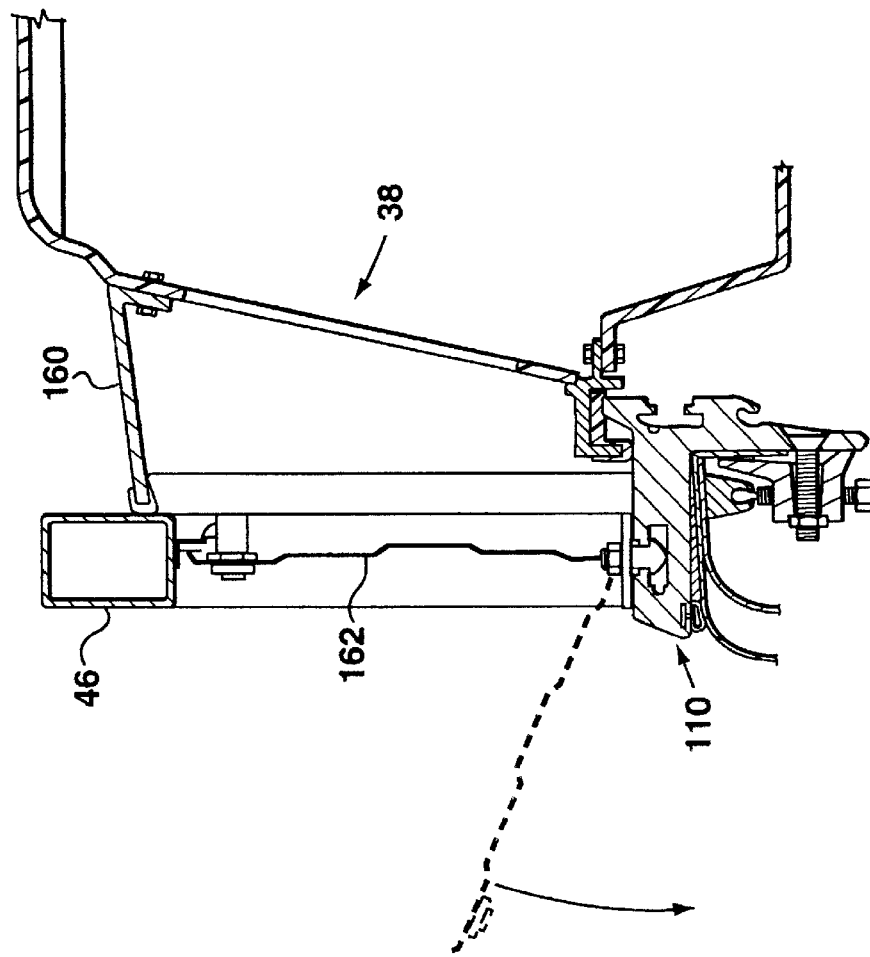
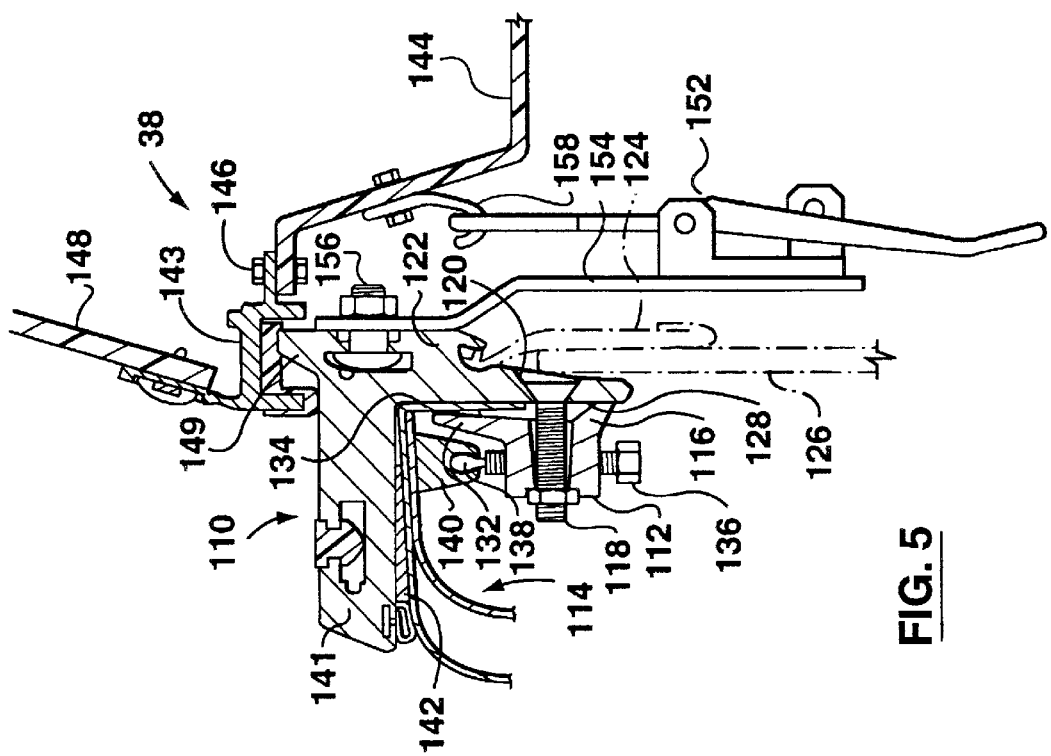

6,152,513

SYSTEM FOR PICKUP TRUCKS HAVING STORAGE COMPARTMENT

This application is a continuation-in-part of application Ser. No. 08/807,752 filed on Feb. 27, 1997, now U.S. Pat. No. 5,882,058.

FIELD OF THE INVENTION

This invention relates to a cargo anchoring and protection system for the cargo bed of a pickup truck and more particularly to a storage compartment and cargo enclosure.

BACKGROUND OF THE INVENTION

Accessories such as cab guards, bed liners, protective bed rail caps and cargo enclosures have been used in the past on pickup trucks. They are generally designed and manufactured without consideration being given to the relationship between the accessories. In fact the accessories often conflict with one another. One popular requirement is to add a cargo enclosure to the pickup truck bed. Such an enclosure has to be attached to the pickup truck and this would be best achieved in combination with a cargo anchoring and protection system which can be attached to the pickup truck and receive accessories such as the storage compartment.

Storage compartments are commonly made to be supported on the side walls of the cargo bed of a pickup truck in such a way that the compartment is located behind the cab of the truck and suspended between the walls. Access is through conventional lids which open upwardly and which often require the user to climb onto the cargo bed to make full use of the compartment. Usually there are two lids hinged at the centre of the storage compartment so that it is not possible to conveniently store longer items.

It is among the objects of the present invention to provide an improved cargo anchoring and protection system which incorporates a storage compartment having improved access for longer objects and to make better use of the space behind the cab of the truck.

It is also an object of the present invention to provide an improved storage compartment for pickup trucks which can be attached to the pickup truck behind the cab of the truck.

SUMMARY OF THE INVENTION

In one of its aspects the invention provides a storage compartment for attachment to anchor rails on a pickup truck. The compartment has a main body and a bottom defining an open-ended box and doors are coupled to ends of the box and operable to close the enclosure and to provide access, and releasable latches are coupled to the enclosure to attach the storage compartment to the anchor rails.

In another of its aspects the invention provides a cargo anchoring and protection system for the cargo bed of a pickup truck. The system has a pair of anchor rails adapted to be attached to the tops of the walls of the pickup truck, at least one anchor beam, and mounting brackets for attaching the anchor beam to the anchor rails with the beam at right angles to the anchor rails. An enclosure is provided for positioning between the anchor rails. The enclosure has a storage compartment including a main body and a bottom defining an open-ended box. End doors are coupled to the box to close the enclosure and to provide access, and the storage compartment can be attached to the anchor rails.

BRIEF DESCRIPTION OF THE DRAWINGS

The invention will be better understood with reference to the drawings, in which:

FIG. 5 is a sectional view on line 5—5 of FIG. 1 and showing the attachment of the storage compartment and anchoring and protection system shown in FIG. 1; and FIG. 6 is a sectional view of an alternative embodiment of anchor rail with another embodiment of storage container attached to the rail.

DESCRIPTION OF THE PREFERRED EMBODIMENT(S)

Figure 1:
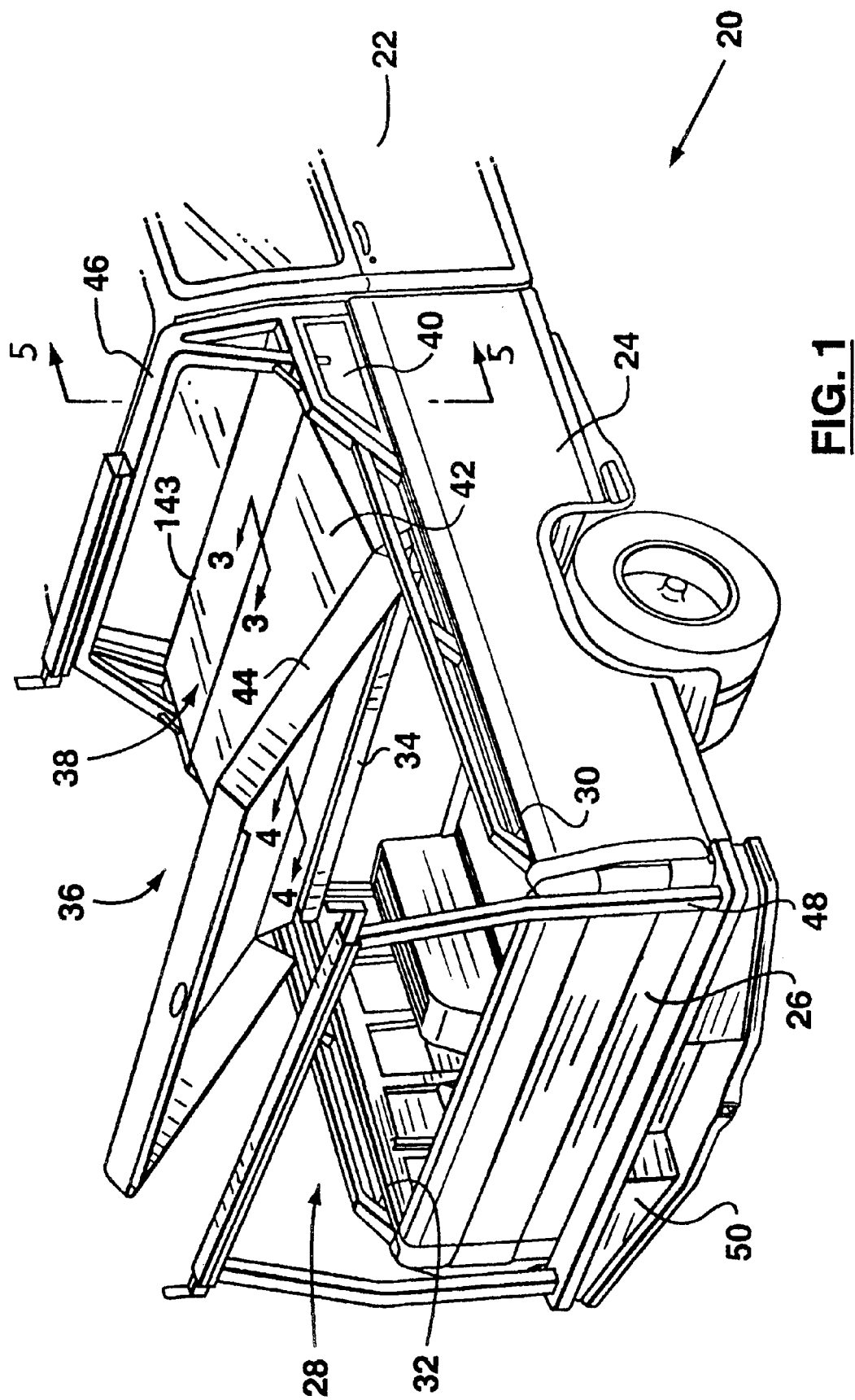
FIG. 1 is an isometric view of a rear part of a pickup truck having a cargo anchoring and protection system incorporating a cargo enclosure having a storage compartment according to a preferred embodiment of the invention, and also showing an optional cab guard.

Referring now to the drawings, FIG. 1 illustrates a conventional pickup truck designated generally by the numeral 20 and including a cab 22 and a cargo bed 24 having a tailgate 26. A preferred embodiment of the invention is mounted on the pickup truck 20 and includes a cargo anchoring and protection system having an attachment system 28 including a pair of anchor rails 30, 32. An extruded cross bed anchor beam 34 extends between the rails 30, 32 and an enclosure 36 is shown in an open position to view the cargo area of the cargo bed 24. The enclosure 36 includes an open-ended front storage compartment 38 having end doors 40 providing access into the compartment 38, a centre lid 42 and a rear lid 44. A cab guard 46 is optionally used in combination with the compartment 38 and this guard 46 can form part of a load carrying structure which includes a frame 48 attached to a bumper 50 of the pickup truck.

Figure 2:
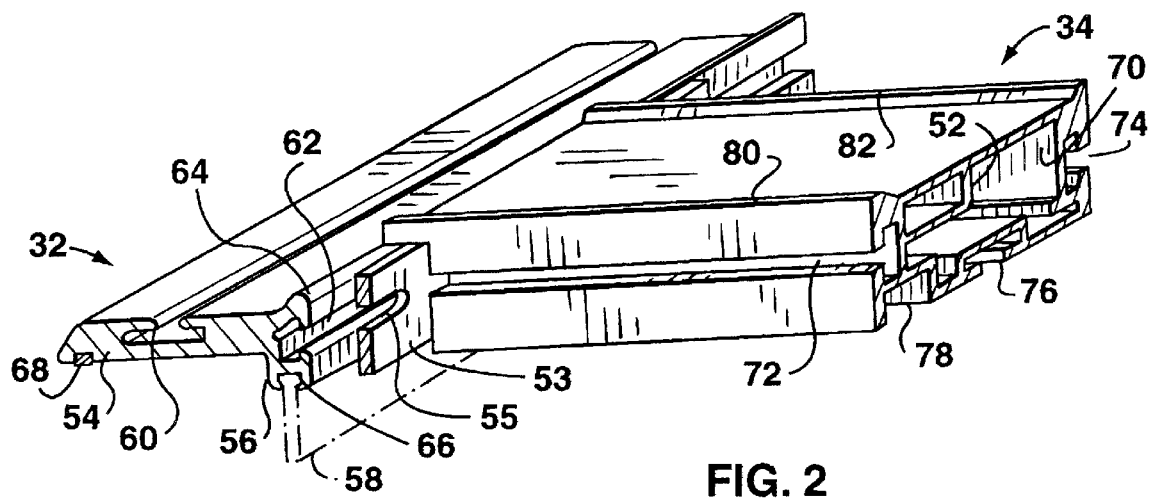
FIG. 2 is an isometric view of a portion of the cargo anchoring and protection system and showing an anchor rail coupled to an anchor beam.

Referring now to FIG. 2, this isometric view illustrates some of the details of the attachment system also referred to as a cargo anchoring and protection system. Anchor rail 32 (which is similar to rail 30) is shown adjacent beam 34 and ready to receive fasteners (not shown) in T-slot 51 for engagement in end slots 55 (one of which is seen) of a plate 53 forming part of a mounting bracket 52 which is a sliding fit inside the extruded anchor beam 34. The fit is such that minor variations in the distance between the anchor rails 30, 32 can be accommodated.

Referring now specifically to the components of the cargo anchoring and protection system shown in FIG. 2, the anchor rail 32 is an elongated extruded member having a horizontal segment 54 adapted to rest on top of a side wall of the cargo bed 24 and a vertical segment 56 extending downwardly inside the cargo bed adjacent a flange of the side wall to receive an optional member 58 typically forming part of a bed liner. The horizontal and vertical segments define optional horizontal and vertical T-slots 60, 62 to receive fasteners to retain anchoring devices, etc.

The inner top corner of the anchor rail 32 has an integral vertically protruding ridge 64 projecting as an extension of the vertical segment 56 and acting as a weather guard and guide rail as will be explained.

The lower portion of the vertical segment 56 of the anchor rail 32 embodies a semi-circular elongate channel 66 designed to accept the removable interlocking member 58 which, as explained, could optionally be part of a liner for the bed of the pickup truck. A flexible bulb type seal may be provided in a suitable slot 68 to act as a weather seal between the anchor rail 32 and the pickup truck cargo bed on assembly.

The anchor rail 32 (and rail 30 seen in FIG. 1) can be attached directly to the wall of the cargo bed of the pickup truck using through bolts (not shown) engaged downwardly through the horizontal segment 54.

The anchor beam 34 extends between the anchor rails 30, 32 (FIG. 1) and receives a pair of mounting brackets 52, one at each end, to permit attachment to the anchor rails 30, 32 at a selected location along the length of the rails.

It will be seen in FIG. 2 that the anchor beam 34 defines a generally rectangular opening 70 to receive the similarly shaped mounting bracket 52. Also, optional side T-slots 72, 74 are provided as well as a bottom T-slot 76 and recess 78, all for attachment and location of parts useful in a pick-up truck cargo bed.

The anchor beam 34 also includes integrally formed upwardly extending side projections 80, 82 to act as guide rails and water drain ridges to guide rain water towards the anchor rails 30, 32 where the water is directed by the ridges 64 on the anchor rails.

Returning to FIG. 1, the anchor beam 34 provides support where the centre lid 42 (behind the front storage compartment 38) meets the rear lid 44.

The enclosure 36 includes the front storage compartment 38 extending across the cargo bed behind the truck cab and including end doors 40 providing access, (as will be described) and the centre lid 42 also providing access and located rearwardly of the compartment 38. Similarly, the rear lid 44 provides access resulting in a lockable enclosure for the bed of a pickup truck.

The storage compartment 38 extends between anchor rails 30, 32 (FIG. 1) and projects below the rails to extend between the side walls of the cargo bed of the truck. Also, the compartment extends upwardly behind the cab and the doors extend upwardly from above the rails 30, 32.

The parts 38, 42 and 44 can be easily removed separately if desired starting from the rear. All of the enclosure assemblies of the system are adapted to be mounted on the anchor rails 30, 32 at the same time as the cab guard 46 to provide safety protection at all times.

Figure 3:
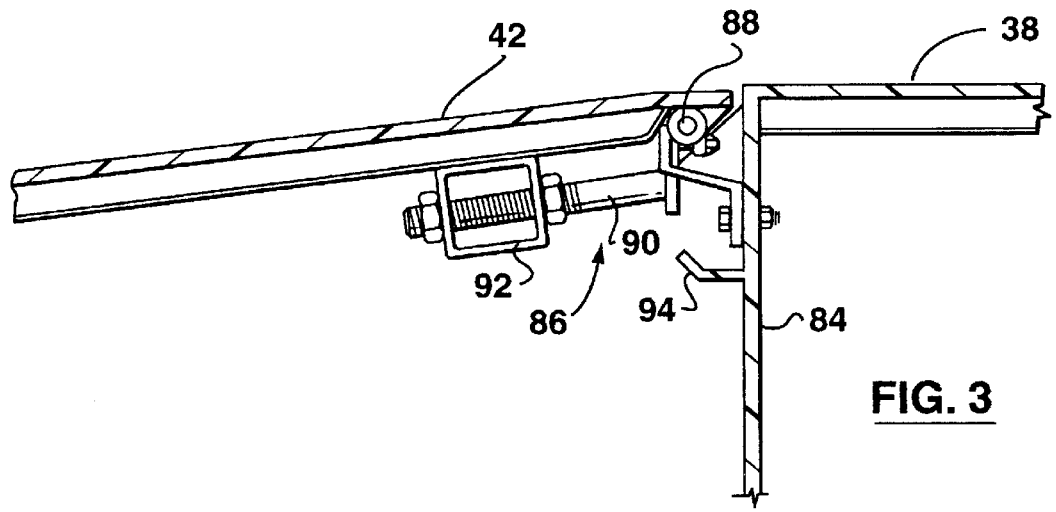
FIG. 3 is a sectional view taken generally on line 3—3 of FIG. 1.

Details of the enclosure system will now be described initially with reference to FIG. 3. The centre lid 42 is removably affixed to a rear vertical wall 84 of the front storage compartment 38 by way of a pair of adjustable hinges 86 (one of which is shown). Each hinge incorporates a pivot structure 88 and an adjustable threaded rod 90 which protrudes through a cross beam 92 permanently attached to the underside of the centre enclosure lid 42. One side of the pivot structure 88 is attached to the wall 84 and the other to the beam 92. As a result, the lid 42 can be positioned squarely with respect to the anchor rails 30, 32 (FIG. 1) of the system. The front storage compartment 38 of the enclosure system incorporates a protruding channel 94 formed into the rear of the vertical wall 84 to catch water draining between the two compartments.

Figure 4:
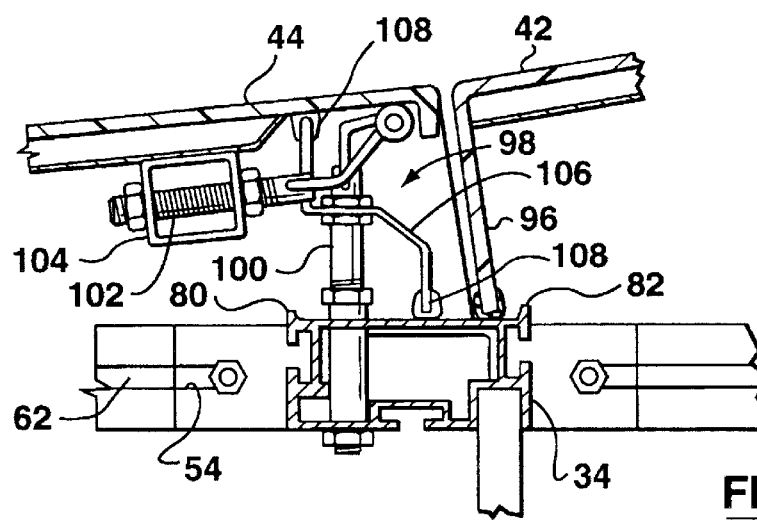
FIG. 4 is a sectional view taken generally on line 4—4 of FIG. 1.

Turning now to FIG. 4, the lid 42 meets lid 44 above the anchor beam 34 which provides support for a rear vertical wall 96 of the centre enclosure lid 42 and hinged supports 98 (one of which is seen) at the front of the lid 44. Each of the hinged supports 98 incorporates an adjustable threaded rod 100 which protrudes through a weather sealed sleeve and secures the rear lid 44 to the cross bed anchor beam 34. The hinged support also incorporates an adjustable threaded rod 102 which extends through a cross beam 104 on the underside of the lid 44. This provides means for squarely positioning the rear lid 44 of the enclosure system. Weather sealing between the rear lid 44 and the anchor beam 34 is in the form of an offset elongate member 106 which extends the full length of the cross bed anchor beam 34. It is adjustably affixed to the vertical threaded rods 100 of the hinge assembly and includes flexible channel type seals 108 on both edges.

Suitable locks and/or latches can be added to the lids 42, 44 to permit opening and locking the lids 42,44 independently. Both lids provide access to the full extent of the compartment making it convenient for access from the sides of the pickup truck and to store long articles. Also, the lid 44 can be removed without affecting lid 42 and then this lid 42 can be removed leaving only the compartment 38. However, it should be appreciated that the compartment 38 forms a base for the addition of the lids 42 and then 44 as will become evident from the subsequent description.

Reference is next made to FIG. 5 which illustrates an alternative embodiment of anchor rail 110 which is somewhat similar to the anchor rail 32 previously described, with the exception that this anchor rail includes an attachment structure 112 to provide for clamping the anchor rail to a side wall 114 of the pickup truck. This contrasts with the earlier rails 30, 32 which were attached using any conventional through bolting.

The attachment structure 112 includes a clamping element 116 which defines a through opening for an attachment bolt 118 with clearance to allow tilting of the element 116. The bolt is housed in a counter-sunk opening 120 in a vertical segment 122 of the anchor rail 110. This segment 122 is also arranged to receive a connecting element 124 for attachment to a bed liner 126.

The clamping element 116 includes a bottom corner piece 128 which engages in a step 130 facing outwardly and formed at the bottom of the segment 122. Above this step, a projection 132 on the element 116 engages behind a downward flange 134 forming part of the wall 114. As a result, when the bolt 118 is tightened, the element 116 pivots about the bottom to bring the projection 132 hard against the flange 134 which is then sandwiched between the segment 122 and the projection 132. This clamping action is supplemented by a vertical adjuster 136 which is also threaded in the element 116 and projects upwardly terminating at a spherical seat 138 in a shoe 140. This shoe engages on the underside of the wall 114 and brings horizontal segment 141 downwardly into engagement with a shim 142 which is used to take up irregularities in the wall 114.

As also seen in FIG. 5, the storage compartment 38 is mounted on the anchor rail 110. The compartment consists essentially of an upwardly extending main body 143 (also seen in FIG. 1) which is made from fibreglass and has a bottom 144 (also of fibreglass) attached by peripheral bolts 146 to complete the container. The bottom extends downwardly below the bolts and between the anchor rails to form a depression and increase the volume of the compartment. The main body and the bottom combine to form an open-ended box with openings at the ends providing access.

In the embodiment shown in FIG. 5, it is anticipated that the compartment will be used without the cab guard 46 shown in FIG. 1. A door structure 148 is attached using conventional hinges, etc. to provide access through the ends into the open-ended enclosure of the compartment 38. The main body 143 sits on an upstanding ridge 149 of the rail 110 and is drawn downwardly for location on this ridge and on an upper surface of a horizontal segment 141 of the rail 110, by an overcentre latch 152. This latch is supported on a plate 154 which is anchored by bolts 156 in a T-slot in the anchor rail 110. The latch 152 operates on a hook 158 attached to the bottom 144 so that in the position shown, there is a predetermined downward force applied to hold the compartment 38 in place on the anchor rail 110.

The compartment 38 would normally be held in place by four overcentre latches 152 and these latches make it simple to remove the compartment by undoing the latches and lifting the compartment off the pickup truck. Once the compartment is removed, the overcentre latches and support plate 154 can be left in place or removed by releasing the bolts 156.

The structure shown in FIG. 5 is to be preferred when there is no cab guard 46 (FIG. 1). In circumstances such as that shown in FIG. 1, where a cab guard 46 is used, the guard combines with the storage compartment 38 by providing the doors 40 actually built into the cab guard. This provides end access in the same way as doors 148 (FIG. 5) but simplifies the access which would otherwise be impeded by the cab guard 46. A suitable structure to accommodate the cab guard is shown in FIG. 6. Here again the anchor rail 110 is shown as an exemplary rail and the same main parts of the compartment 38 are used. However, in place of the door 148 shown in FIG. 5, the opening that would normally be closed by the door is surrounded by a spacer 160 to effectively bring the opening outwards to the cab guard 46 so that a door 162 can be accommodated in the cab guard rather than directly in the compartment. This allows end access into the compartment.

The cargo anchoring and protection system can be varied within the scope of the invention. Further, the compartment can be varied in shape consistent with the scope of the claims, All such variations are within the gambit of the claims which are supported by the exemplary embodiments of the invention previously described.

What is claimed is:

1. A cargo anchoring and protection system for the cargo bed of a pickup truck, the system including:
   a pair of anchor rails adapted to be attached one to each of the tops of the side walls of the pickup truck;
   at least one anchor beam;
   mounting brackets for attaching the anchor beam to the anchor rails with the beam at right angles to the anchor rails, the mounting brackets being adapted to be attached to the anchor rails, and the anchor beam being adapted to cooperate with the brackets to mount the beam between the rails such that the beam is free to accommodate small variations in the distance between the rails;
   an enclosure for positioning on the anchor rails and on the beam, the enclosure including a storage compartment having a main body, a bottom defining an open-ended box, end doors coupled to the box and operable to close the box and to provide access; and
   means for attaching the enclosure to the anchor rails.

2. A cargo anchoring and protection system as claimed in claim 1 in which the means for attaching the enclosure to the anchor rails include over-centre latches.

3. A cargo anchoring and protection system as claimed in claim 1 in which the bottom defines a depression for location between and below the anchor rails to increase the volume of the box.

4. A cargo anchoring and protection system as claimed in claim 1 in which each of the anchor rails includes a horizontal segment for engagement on the top of one of said side walls and a vertical segment for engagement with the side wall inside the cargo bed.

5. A cargo anchoring and protection system as claimed in claim 4 in which each of the anchor rails further includes an attachment structure operable to attach the anchor rail to the side wall without penetrating the side wall.

6. A cargo anchoring and protection system as claimed in claim 1 and further including a cab guard for attachment to the anchor rails outwardly of the storage compartment.

7. A cargo anchoring and protection system as claimed in claim 6 in which the end doors are mounted on the cab guard and in which spacers are provided between the cab guard and storage compartment so that the doors provide access into the open-ended box of the storage compartment.

8. A cargo anchoring and protection system as claimed in claim 1 in which each of the rails defines an upstanding ridge and the beam includes a pair of longitudinally extending side projections, the side projections being arranged to be above the ridges for guiding rainwater off the beam and on to the anchor rails where the rain is guided outwardly of the cargo bed by the ridges.

* * * * *